… … …

United States Patent Office 3,608,133
Patented Sept. 28, 1971

3,608,133
MOLD SYSTEM FOR THE PRODUCTION OF ELONGATED HOLLOW INJECTION-MOLDED ARTICLES
Wilhelm Cyriax and Rainer Schutt, Kottingbrunn, near Vienna, Lower Austria, assignors to Battenfeld Maschinenfabriken GmbH Meinerzhagen, Westphalia, Germany
Filed Oct. 28, 1968, Ser. No. 771,063
Claims priority, application Germany, Nov. 3, 1967, P 16 29 720.4
Int. Cl. B29c 11/00
U.S. Cl. 18—2RM                       1 Claim

ABSTRACT OF THE DISCLOSURE

An apparatus for producing long sleeve-like injection-molded articles of uniform cross-section, wherein the article is held by its extenral periphery and by its injector end, in a first mold section in the form of a cavitated body. A core plug, which defines the internal periphery of the molded article, projects through the second mold section into the first. The core plug is first withdrawn from the article, held at two opposite ends in the mold sections and subsequently the second mold section is withdrawn from the article held in the first mold section, finally the article being released by opening the first mold section.

---

Figure 1:
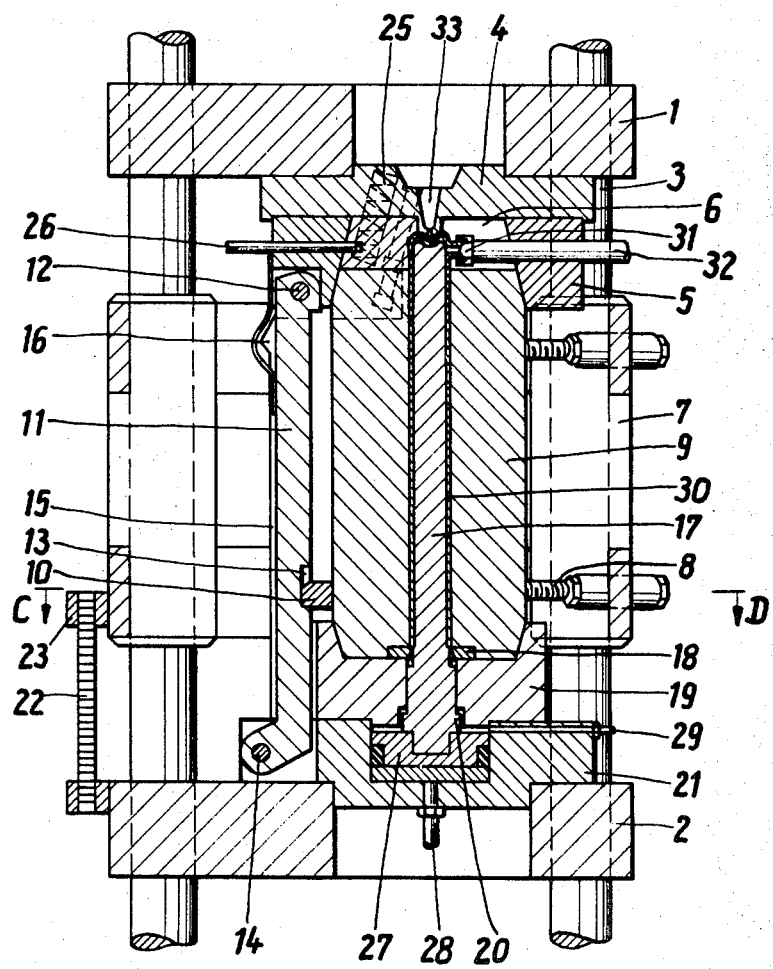

This invention relates to injection molds for making, long, sleeve-like articles of uniform cross-section.

In known methods of manufacturing sleeve-like articles of this kind by injection-molding techniques, a first mold section, consisting of several jaws movable radially in relation to the article, located at the injection side and designed to receive the mold section serving as the injector, is provided and adjoins a second mold section corresponding in length approximately to the length of the article. The second mold section is penetrated by a core plug, which projects into the first mold section. During injection molding, the plastic material is forced through the injector into the first mold section and fills out the cavity formed between the core plug and the two aforedescribed mold sections which are held together. After the injection process has been completed, the extraction of the injection-molded article from the mold is carried out by opening the jaws of the first mold section and releasing the core plug with the press-molded sleeve-like article in position on it, from the second mold section. If the article is provided at the injection end, formed by the first mold section, with projections or the like which extend beyond the periphery of the sleeve cross-section, then the second mold section must consist of two halves which have to be split because in cases of this sort the molded article cannot be extracted from a closed mold; even with this kind of design, the lines of parting of the mold halves may be visible upon the molded article in the form of a witness, and this generally undesirable. The article adhering to the core plug is subsequently extracted by a stripper ring engaging behind the end of the article and moving relatively to the plug. This has the drawback that during the stripping operation, in particular where the article's wall thickness is small, the article is distorted since it adheres to the core plug with the result that stripping upsets the cross-section thereby rendering the article unsuitable for its ultimate purpose.

In order to avoid this drawback, the procedure has been adopted in the case of sleeve-like articles of this sort, in particular thinwalled ones, that first of all a tube is produced, for example by extrusion techniques, and this tube cut up in the desired lengths. Then a base is joined to the tube semi-manufacture by adhesion or injecting-molding. By means of this two-stage process of manufacture, although the disadvantage referred to hereinbefore is avoided, the procedure is nevertheless complex and laborious because of the two-stage nature.

Also, the approach has been adopted that the sleeve-like article is extracted from the mold by providing on the core plug a longitudinally displaceable sleeve by which the article is ejected from the mold. However, it is necessary in this context to use a sleeve which has at least the same length as the article; the coreplug must have a length corresponding to at least twice the length of the molded article because the sleeve surrounds the plug. There is therefore a substantial drawback, wherein the sleeve used for the ejection of the molding requires the tool to be twice its length, and this is something which must be avoided particularly in the context of long sleeve-like products.

It is an object of the present invention to enable the removal of the sleeve-like article from the mold, in such a way as not to damage or distort the product during the removal operation, and as not to require twice the normal tool length. This is achieved by firstly withdrawing the core plug from the article, held at both ends in the mold sections, and then removing the second mold section from the article while the article is still held by the first mold section. Finally the article is released by opening the first mold section.

The present invention comprises a system for extracting from a mold long sleeve-like injection-molded articles of uniform cross-section, wherein the article is held by its external periphery and by its injector end. The apparatus comprising a first mold section or member in the form of a cavitated body (i.e. provided with a recess forming the end of an elongated mold cavity), a core plug which defines the internal periphery of the molded article projecting through the second mold section or member and reaching into the first, and wherein firstly the core plug is withdrawn from the article, held at two opposite ends in the mold sections and subsequently the second mold section is withdrawn from the article which is held in the first mold section; finally the article is released by opening the first mold section.

The present invention further consists in an apparatus wherein there are two mold sections (members), the first mold section including at least two jaws and the other mold section contiguous to the first in the form of a body having a cavity wherein a core plug (e.g. on a third mold section or member) adapted to define the internal periphery of the molded article is arranged to project through the second mold section into the first, said core plug being slidably mounted and wherein the arrangement is such that firstly the core plug be withdrawn from the article being molded, held at two opposite ends in the mold sections and subsequently the second mold section can be withdrawn from the article held in the first mold section, finally the article being released by opening the first mold section.

According to the invention the second mold section may be equipped at an end remote from the first cross-section, with a stripper ring which closely surrounds the core plug. Due to the provision of the stripper ring on the end of the second mold section, the article is held firmly in position in the two mold sections so that during the extraction operation, it releases from the core plug and remains in the mold. If, then, the second mold section is longitudinally displaced to part it from the first mold section, the article can be made to drop out of the mold by opening the first mold section.

The second mold section is longitudinally displaceable in relation to the first, and can be locked by at least two diametrically opposite locking elements, in a position of abutment against the first mold section. By virtue of the locking arrangements in accordance with the invention, during the extraction of the core plug from the mold sections, the second mold section is held in contact with the first. When the core plug has been fully withdrawn from the second mold section, the locking or latch arrangements are released and the second mold section is axially displaced to release it from the first, while the article is retained by said first section. After the second mold section has been displaced sufficiently far to release it from the article, then the latter can be completely released by the opening of the mold.

The locking arrangement consists of a latch pivotally attached to the first mold section and embracing the second mold section, said latch carrying a recess which can engage on a lug formed on the second mold section, and said latch furthermore having at its externally projecting end a pin cooperating with a slideway attached to the base plate or third mold member carrying the core plug, said slideway having a release cam. In the locked position, in which the two mold sections are held in contact with one another, the lug on the second mold section is engaged with the recess on the latch. When, during the extraction withdrawal of the core plug, the cam on the slideway hits the pin, the latch is lifted and thus the two mold sections unlock so that the article can now be released by longitudinal displacement of the second mold section. To this end, in accordance with the invention, the plate carrying the core plug is equipped with a coupling element attached to the guide bearings of the second mold section, said coupling component having a lost-motion travel corresponding to the length of the core plug. The lost-motion travel of the coupling component is so contrived that this component only entrains the guide bearings of the second mold section and therefore the latter section itself, when the core plug is fully disengaged from the second mold section.

Finally, the spring-loaded jaws located in a collet, of the first mold section, exhibit a releasably designed device locked to the body forming said collet and denoted a lock means. In order that, during the longitudinal displacement of the second mold section the jaws of the first mold section shall remain in the closed position, they are held in the locked condition until the product is released by the second mold section.

Figure 2:
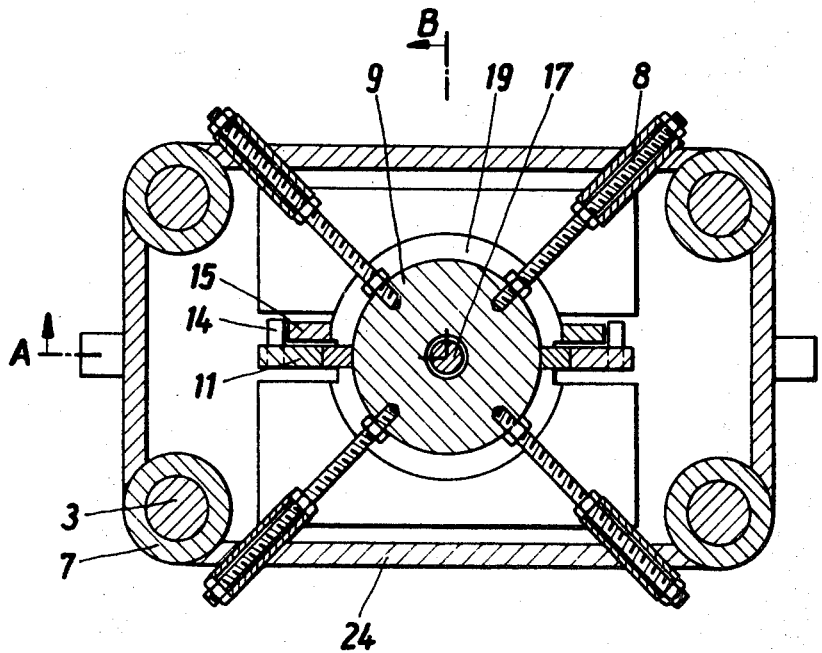

In the accompanying drawing:

FIG. 1 is a longitudinal section through the device in accordance with the invention taken on the line A–B of FIG. 2; and FIG. 2 is a cross-section taken on the line C–D of FIG. 1.

FIGS. 1 and 2 show a plate 1 at the injector end and an opposite plate 2 between which plates the mold is arranged. The plates 1, 2 are arranged on four rails 3, as FIG. 2 shows. By mutual displacement of the plates 1 and 2, the mold can be opened and closed. The plate 1 carries the injector-side tool plate 4, to which, in turn, the collet 5 is attached. The tool plate 4 contains the injector with the sprue taper 33. In the collet 5, the jaws forming the first mold section 6 are arranged. On the rails 3, are disposed the sleeve-like guide bearings 7 which carry a frame 24. In the frame 24, centering screws 8 are provided which connect the second mold section 9 with the frame. The mold section 9 is a one-piece cavitied component and carries a lug 10 which engages with a recess 13 on the latch 11 when the mold section 9 is up in engagement with the jaws of the first mold section 6, as shown in FIG. 1. The latch 11 is pivotable about a pin 12 on the collet 5. It is provided at its opposite end with a follower pin 14 running over a slideway 15 fixed to the core guide plate 19. This slideway 15 carries a cam 16. With the mold sections 9 and 6 in the closed condition, the interval between the follower pin 14 and the cam 16 is equivalent to the length of the sleeve-like component. The core plug 17 is housed in a core guide plate 19 and has a shoulder portion 20 of enlarged diameter which runs in a corresponding bore in the core guide plate 19. At the end of the second mold section 9, a stripper ring 18 is attached which surrounds the shank of the core plug 17 closely. The core plug 17 is attached to a piston 27 arranged in the core base plate 21. The core base plate 21 is fixed to the plate 2. Plate 2 carries a coupling chain 22, which is taken around a projection 23 on the guide sleeve 7. With the plate 2 in the position shown in FIG. 1, the chain hangs down around the extension 23. The jaws 6 are loaded by the compression springs 25 arranged in the tool plate 4 and tend with release of the jaws 6 to move them into the open position in the collet. In order to prevent such displacement and therefore the opening of the jaws 6, a locking pin 26 is slideably mounted in the collet 5 and this projects into the jaws 6 and holds them closed until it is withdrawn into the release position.

The space within the base plate 21, which accommodates the piston 27, is connected with lines 28 and 29 for a pressurized medium by means of which the piston and the core plug attached to it, can be axially displaced in order to be centered at its forward end against the jaws 6. In the forward end face of the core plug 17, grooves are milled so that the material coming from the injector flows into the mold when the piston 27 is forced by the fluid, coming through line 28, into the advanced position in which the leading end of the core plug 27 is centered. Shortly before the end of the injection process, the piston 27 is returned into the position shown in FIG. 1, by the admission of fluid through the line 29, in order to fill out the base of the article 30. In FIG. 1, the article 30 to be produced by injection molding, is the casing of an air pump which has a hose connector 31 which is finish-formed by a pluner 32.

The mode of operation of the device in accordance with the invention is as follows. When the injection molding operation has been completed, with the mold in the position shown in FIG. 1, first of all the plate 2, complete with the base 21 and the guide plate 19, is moved in the opening direction and the core plug 17 withdrawn from the mold sections 9 and 6. The article 30 is meanwhile held at its forward end by the jaws of the first mold section 6, its rearward end being up against the stripper ring 18 of the mold section 9. With the extraction of the core plug 17, the article 30 thus remains in place in the mold sections 9 and 6 which are still tight up against one another. During the opening motion of the plate 2, the coupling chain 22 runs over the extension 23 of the guide bearing 7, until its end arrives there. At this time, the cam 16 on the slideway 15 will have engaged the pin 14 on the latch 11. The latch 11 is pivoted about the pin 12 and the lug 10 thus disengaged from the claw 13. With continuing movement of the plate 2, the coupling chain 22 comes up hard against the projection 23 and the guide bearings 7, and consequently the mold section 9, are entrained by it, moving likewise in the opening direction and being released from the article 30 which is now held exclusively by the jaws of the first mold section 6. This done, the locking pin 26 is released and the jaws of the first mold section 6 move outward under the effect of their springs 25, opening and allowing the finished article 30 to drop out.

We claim:

1. A mold system for the production of elongated hollow injection-molded articles, comprising:

an injector-side tool plate provided with a sprue-forming inlet for a synthetic resin to be injected into the system;

a first mold member axially shiftable relative to said tool plate and comprising a plurality of clamping jaws recessed to define an end portion of a mold cavity communicating with said inlet and engaging the periphery of the corresponding end of an article injection-molded in said cavity proximal to said plate;

a clamping member around said clamping jaws and cooperating therewith upon the axial displacement of said jaws to urge said jaws together and permit said jaws to spread apart;

an axially extending and elongated second mold member having an end axially abuttable with said first mold member and defining an axially extending main portion of said mold cavity registering with said first mold member, said second mold member being axially shiftable relative to said first mold member, said second mold member being formed with a stripper ring along the wall of its cavity at an end thereof remote from said first mold member;

a third axially shiftable mold member abuttable with said end of said second mold member remote from said first mold member and having an axially extending core reaching through said cavity into the recesses of said jaws in a closed condition of the mold system, said core being closely surrounded by said stripper ring and defining the interior of said article upon the injection-molding thereof in said cavity;

locking means for releasably retaining said jaws against axial movement relative to said clamping member;

latch means including a swingable latch member pivotally mounted on said clamping member and releasably interconnecting said first and second mold members in axially aligned relationship; and actuating means on said third mold members effective to release said latch means upon at least partial withdrawal of said core from the injection-molded article upon movement of said third mold member axially away from said first mold member and for thereafter entraining said second mold member in the direction of said third mold member away from said first mold member whereby said article is retained exclusively by said jaws until release of said lock means.

References Cited

UNITED STATES PATENTS

| | | |
|---|---|---|
| 2,358,857 | 9/1944 | Gits. |
| 2,956,321 | 10/1960 | Halwaid. |
| 2,994,921 | 8/1961 | Hultgren _____ 18—2X |
| 3,049,759 | 8/1962 | Eberhardt _____ 18—42 |
| 3,052,916 | 9/1962 | Campbell. |
| 3,060,509 | 10/1962 | McCubbins _____ 18—42 |
| 3,064,310 | 11/1962 | Cooprider _____ 18—2PX |
| 3,165,788 | 1/1965 | Davidson _____ 18—42 |
| 3,169,276 | 2/1965 | Hugentobler. |
| 3,183,552 | 5/1965 | Farkas _____ 18—42DX |
| 3,224,040 | 12/1965 | Bridges et al. _____ 18—2MX |
| 3,264,684 | 8/1966 | Moslo _____ 18—42DX |
| 3,343,222 | 9/1967 | Kacalieff _____ 18—2PX |
| 3,389,434 | 6/1968 | Cleereman et al. _____ 18—42 |
| 3,398,781 | 8/1968 | Bevis _____ 18—2PX |
| 2,850,766 | 9/1958 | Press et al. _____ 249—68X |
| 3,289,252 | 12/1966 | Bromley _____ 18—42 |

J. HOWARD FLINT, JR., Primary Examiner

U.S. Cl. X.R.

18—42D; 249—68